United States Patent [19]

Doak

[11] 4,339,554

[45] Jul. 13, 1982

[54] POLYVINYL CHLORIDE RESIN BLENDS

[75] Inventor: Kenneth W. Doak, Murrysville, Pa.

[73] Assignee: Atlantic Richfield Company, Los Angeles, Calif.

[21] Appl. No.: 217,732

[22] Filed: Dec. 18, 1980

[51] Int. Cl.³ .................... C08L 51/04; C08L 27/06
[52] U.S. Cl. ................................ 525/63; 525/73; 525/74; 525/205; 525/207
[58] Field of Search .................. 525/207, 205, 93, 96, 525/63, 73, 74

[56] References Cited

U.S. PATENT DOCUMENTS

| 3,626,033 | 12/1971 | Keskkula et al. | 525/207 |
| 4,122,130 | 10/1978 | Fava | 525/74 |
| 4,129,614 | 12/1978 | Fava | 525/74 |
| 4,197,376 | 4/1980 | Lee et al. | 525/74 |
| 4,311,806 | 1/1982 | Du Four | 525/71 |

Primary Examiner—Carman J. Seccuro

[57] ABSTRACT

A polyvinyl chloride resin blend having a high heat distortion temperature, comprising a blend of 60–80 percent by weight of a polyvinyl chloride resin and 20–40 percent by weight of a copolymer of a vinyl aromatic monomer, such as styrene, and either 14–27 percent by weight of maleic anhydride or 10–18 percent by weight of an imide derivative of maleic anhydride.

2 Claims, No Drawings

POLYVINYL CHLORIDE RESIN BLENDS

BACKGROUND OF THE INVENTION

The present invention relates to blends of polyvinyl chloride resins with copolymers of vinyl aromatic compounds such as styrene, vinyltoluene, or chlorostyrene.

The blending of polyvinyl chloride resins with other polymeric materials has heretofore been suggested for the purpose of altering the properties of a polyvinyl chloride resin to suit particular applications. Such blends are described, for example, in U.S. Pat. No. 3,626,033 which teaches the formation of blends of polyvinyl chloride, a polydiene rubber nitrile graft copolymer, and a styrene-maleic anhydride copolymer containing 15-30 weight percent of maleic anhydride; and U.S. Pat. No. 3,882,192 which teaches the formation of blends containing a polycarbonate, a vinyl chloride polymer, and an ABS graft polymer, styrene/maleic anhydride copolymer or an ethylene/vinyl acetate copolymer.

SUMMARY OF THE INVENTION

A polyvinyl chloride resin blend is provided which has a desirably high heat distortion temperature, the blend formed by intimately mixing 60-80 percent by weight of a polyvinyl chloride resin with 20-40 percent by weight of a copolymer of a vinyl aromatic monomer, such as styrene and either 14-27 percent by weight of maleic anhydride or 10-18 percent by weight of an imide derivative of maleic anhydride. Copolymers with these compositions can be intimately dispersed in vinyl chloride polymers and copolymers to form homogeneous blends which exhibit heat distortion temperatures 15°-35° F. higher than those of the vinyl chloride polymers. This enables the use of polyvinyl chloride resins in products for which these resins were heretofore unsuitable. These blends are particularly suitable for products requiring a heat distortion temperature of at least 190° F.

DETAILED DESCRIPTION

The blends of the present invention contain as the major portion thereof, i.e., 60-80 percent by weight, of a polyvinyl chloride resin. The polyvinyl chloride resins are commerically available and may be formed by the usual methods of emulsion, suspension, bulk or mass polymerizations. The vinyl chloride resin may comprise a homopolymer of vinyl chloride or a copolymer of vinyl chloride and up to about 20 percent (usually no more than 10 percent) by weight of a copolymerizable olefinically unsaturated comonomer such as a vinylidene chloride, vinyl acetate, acrylic acid, methacrylic acid, methyl methacrylate, ethylene, propylene, and the like.

The vinyl chloride resin is intimately mixed with between about 20-40 percent by weight of copolymer of a vinyal aromatic monomer and maleic anhydride or its imide derivative.

The vinyl aromatic monomer which forms a part of the copolymer is preferably styrene, chlorostyrene, or vinyltoluene containing predominantly p-methylstyrene, but may also include other nuclear substituted methylstyrenes, alpha-methylstyrene, tert-butylstyrene, dichlorostyrene, and the like. When alpha-methylstyrene, tert-butylstyrene, or dichlorostyrene are used, it is frequently advantageous to replace only a part of the styrene.

In the embodiment wherein the copolymer is a copolymer of a vinyl aromatic monomer and a maleic anhydride, such as a styrene-malein anhydride copolymer, the maleic anhydride units are distributed somewhat at random along the copolymer chain. The weight percent of maleic anhydride present in the copolymer is between 14-27 percent by weight of the vinyl aromatic-maleic anhydride copolymer composition. Such styrene-maleic anhydride copolymers are known compositions, generally prepared by reacting maleic anhydride and styrene at elevated temperatures in the presence of peroxide catalysts. Such copolymers are, for example, described in U.S. Pat. No. 2,769,804; 2,866,771; 2,971,939; 3,336,267 and 3,919,354. The copolymer preferably will have a weight-average molecular weight of at least 140,000 and more preferably at least 200,000. Melt flow (Condition L, grams/10 minutes) is typically between about 0.20 and 10, and is somewhat dependent on the copolymer type as well as the rubber type. Preferably the styrene or vinyl-toluene copolymer will comprise about 18-25 percent by weight of maleic anhydride.

In the embodiment, however, wherein the copolymer is a copolymer of a vinyl aromatic monomer and an imide derivative of maleic anhydride, such as a styrene-maleimide copolymer, the weight percent of the maleimide present in the copolymer is between 10-18 percent by weight of the vinyl aromatic-maleimide copolymer composition. Such styrene-maleimide copolymers are known compositions formed, for example, by reacting aqueous ammonia with a styrene-maleic anhydride copolymer under autogenous pressure at 125°-200° C., as described in U.S. Pat. No. 3,998,907 to DiGiulio. Preferably, the styrene copolymer will comprise about 12-18 percent by weight of maleimide.

The blending of 20-40 weight percent of anhydride or imide copolymers into PVC usually causes some reduction in toughness. For certain applications it is therefore desirable to use rubber-modified copolymers which have higher impact strength than unmodified copolymers. Such rubber-modified copolymers typically contain 5-30 percent by weight of rubber, and are generally prepared by copolymerizing styrene and maleic anhydride in the presence of part or all of one or more rubbers such as epichlorohydrin rubbers (Hydrin elastomers of B.F. Goodrich Co.), polybutadiene, acrylate rubbers, rubbers based on ethylene and propylene, a copolymer of butadiene and up to 40% acrylonitrile, chloroprene rubbers, chlorinated polyethylene, rubbery copolymers of ethylene and vinyl acetate, and block copolymers of styrene and 55-90% of butadiene. The block copolymers could include the following, but are not necessarily limited to (a) linear diblock (or "tapered" diblock) copolymers containing 10-45% styrene such as the commercial rubbers Stereon 720 and 840; (b) radial rubbers such as Solprene 406, 411, and 414; (c) triblock copolymers such as Kraton 1101; (d) hydrogenated styrene-butadiene block copolymers such as Kraton G; and (e) star-shaped copolymers containing up to 20 styrene-butadiene diblock branches, sometimes mixed with polybutadiene branches (U.S. Pat. No. 4,010,226). For applications where good light resistance is needed it is desirable to use a rubber such as a hydrogenated styrene-butadiene block copolymer, an acrylate-based rubber, ethylene-propylene rubbers, epichlorohydrin rubber, and the like.

Such rubber-modified copolymers have slightly lower softening temperatures than the unmodified copolymers, e.g. about 5°–15° F. or more, depending on the amount of rubber present. Therefore, more of the rubber-modified copolymer must be used in the blend to obtain the same heat distortion temperature as with the unmodified copolymer. It is sometimes advantageous to use a rubber-modified copolymer of vinyl-toluene and maleic anhydride or chlorostyrene and maleic anhydride.

The polyvinyl chloride resin and styrene-maleic anhydride or styrene-maleimide copolymer may be blended, in the prescribed amounts, by mechanically working the two components at a temperature high enough such that the mass is plasticized, for example by milling on a roll or an internal mixer such as a Banbury mixer. In order to obtain a homogeneous blend the mixing equipment must provide high shear. Generally it is preferable to plasticize the polyvinyl chloride resin first and then add the copolymer to the highly viscous molten resin, preferably in more than one increment. Unsatisfactory mixing is sometimes obtained if solid polyvinyl chloride resin, especially a minor amount, is added to the molten copolymer, which normally has a lower melt viscosity. In some cases good mixing can be obtained in a high shear extruder which has one or more side feed ports for introducing the copolymer to the molten polyvinyl chloride.

The following illustrates the types and amounts of the components used in the blended compositions of the present invention which will exhibit heat distortion temperatures in the range of about 185° F. to 194° F. The polyvinyl chloride resin is an extrusion grade homopolymer containing stabilizers and about 3.0% of a plasticizer, and exhibits a heat distortion temperature of about 162° F. (ASTM Method D648). It may be mixed in amounts of about 75–65 weight percent with about 25–35 weight percent of a styrene-maleic anhydride copolymer containing about 20 weight percent of maleic anhydride. The heat distortion temperatures vary from about 185° F. to about 194° F. In order to obtain about the same temperature range using a copolymer containing about 25 weight percent of maleic anhydride, about 78–69 weight percent of the polyvinyl chloride resin may be mixed with 22–31 weight percent of the copolymer.

In the embodiment wherein an imide derivative of maleic anhydride is used, about the same range of heat distortion temperatures will be obtained by blending about 75–65 weight percent of the polyvinyl chloride resin with about 25–35 weight percent of the styrene-maleimide copolymer containing about 12% maleimide, or by blending about 78–69 weight percent of the styrene maleimide copolymer containing about 15 weight percent maleimide.

In another embodiment of the invention, about 70 weight percent of the polyvinyl chloride resin may be blended with about 30 weight percent of a copolymer containing about 80 weight percent of vinyltoluene and about 20 weight percent of maleic anhydride. The blend will exhibit a heat distortion temperature of about 190° F.

In still another embodiment of the invention, about 60% of the polyvinyl chloride resin may be blended with about 40 weight percent of a rubber-modified styrene-maleic anhydride copolymer containing about 20 weight percent of maleic anhydride. If the copolymer contains about 25 weight percent of block copolymer rubbers based on the total weight, the blend will exhibit a heat distortion temperature of about 190° F.

The above represent results obtainable with one type of polyvinyl chloride resin, a homopolymer containing some plasticizer. However, there are various types of polyvinyl chloride resins which normally exhibit somewhat different heat distortion temperatures, so that the heat distortion temperatures of a blend containing a certain amount of a copolymer will be somewhat dependent on the heat distortion temperature of the polyvinyl chloride resin used. However, the increase in heat distortion temperature caused by the addition of a particular type of copolymer will be dependent primarily on the amount added, and will generally be in the range of 15° F. to 35° F. Blends containing no plasticizer will generally exhibit a slightly higher heat distortion temperature than corresponding blends containing plasticizer. Copolymers of polyvinyl chloride containing a small amount of vinyl acetate or propylene typically exhibit a slightly lower heat distortion temperature than an unplasticized homopolymer.

I claim:

1. A polyvinyl chloride resin blend consisting essentially of a blend of:
   (a) from 60–80 percent by weight of a polyvinyl chloride resin, and
   (b) from 20–40 percent by weight of a rubber-modified copolymer of (1) a vinyl aromatic monomer, (2) 14–27 percent by weight of maleic anhydride and (3) 5–30 percent of a rubber selected from the group consisting of block copolymer rubbers of styrene and butadiene and epichlorohydrin rubbers, said rubber modified copolymer being obtained by polymerizing components (1) and (2) presence of (3).

2. A polyvinyl chloride resin blend consisting essentially of a blend of:
   (a) from 60–80 percent by weight of a polyvinyl chloride resin, and
   (b) from 20–40 percent by weight of a rubber-modified copolymer of (1) a vinyl aromatic monomer, (2) 10–18 percent by weight of an imide derivative of maleic anhydride and (3) 5–30 percent of a rubber selected from the group consisting of block copolymer rubbers of styrene and butadiene and epichlorohydrin rubbers, said rubber modified copolymer being obtained by polymerizing components (1) and (2) presence of (3).

* * * * *